United States Patent
Herve et al.

(10) Patent No.: US 9,624,339 B2
(45) Date of Patent: Apr. 18, 2017

(54) POLYESTER RESINS BASED ON FATTY ACIDS THAT HAVE A SHORT OIL LENGTH, AQUEOUS DISPERSIONS AND ASSOCIATED COATINGS

(75) Inventors: Grégoire Herve, Verberie (FR); Patricia Beurdeley, Montmorency (FR); Michael Kurczak, Liancourt (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/876,222

(22) PCT Filed: Sep. 23, 2011

(86) PCT No.: PCT/FR2011/052208
§ 371 (c)(1),
(2), (4) Date: Mar. 27, 2013

(87) PCT Pub. No.: WO2012/042153
PCT Pub. Date: Apr. 5, 2012

(65) Prior Publication Data
US 2013/0197152 A1    Aug. 1, 2013

(30) Foreign Application Priority Data
Sep. 27, 2010 (FR) ...................... 10 03817

(51) Int. Cl.
| C08G 63/00 | (2006.01) |
| C09D 167/00 | (2006.01) |
| C08G 63/48 | (2006.01) |
| C08J 3/05 | (2006.01) |
| C08L 67/08 | (2006.01) |
| C09D 167/08 | (2006.01) |

(52) U.S. Cl.
CPC ............. *C08G 63/00* (2013.01); *C08G 63/48* (2013.01); *C08J 3/05* (2013.01); *C08L 67/08* (2013.01); *C09D 167/00* (2013.01); *C09D 167/08* (2013.01); *C08L 2201/50* (2013.01)

(58) Field of Classification Search
USPC ............. 528/295.3, 295.5; 523/502; 524/513
See application file for complete search history.

(56) References Cited

U.S. PATENT DOCUMENTS

| 2,609,348 | A | * | 9/1952 | Du Puis et al. ............... 528/289 |
| 2,791,568 | A | | 5/1957 | Shapiro et al. |
| 2,873,210 | A | * | 2/1959 | Barrett, Jr. et al. .......... 428/458 |
| 3,110,690 | A | * | 11/1963 | Friedsam .................... 106/18.36 |
| 3,379,548 | A | * | 4/1968 | Jen ................................ 106/245 |
| 3,440,193 | A | | 4/1969 | Campagna |
| 4,039,495 | A | | 8/1977 | Hunsucker |
| 4,368,316 | A | | 1/1983 | Laddha et al. |
| 4,518,724 | A | * | 5/1985 | Kuwajima et al. ........... 523/501 |
| 6,780,910 | B2 | * | 8/2004 | Bouvy ....................... C08J 3/03 524/366 |
| 2005/0072332 | A1 | * | 4/2005 | Appelman et al. ........ 106/14.42 |
| 2006/0199941 | A1 | * | 9/2006 | Julien et al. .................. 528/272 |
| 2007/0167603 | A1 | | 7/2007 | Urbano et al. |
| 2008/0188588 | A1 | | 8/2008 | Sullivan et al. |
| 2011/0065856 | A1 | | 3/2011 | Anchor |

FOREIGN PATENT DOCUMENTS

| FR | 2 253 057 A1 | 6/1975 |
| FR | 2 483 434 A1 | 12/1981 |
| WO | WO 95/02019 A2 | 1/1995 |

OTHER PUBLICATIONS

English Abstract of FR 2951730 A1, France, Apr. 29, 2011, 4 pages.*
Alkyd emulsions—G. Ostberg, M. Hulden, B. Bergenstahl, K. Holmberg—Progress in Organic Coatings 24 (1994) pp. 281-297—Institute for Surface Chemistry—Stockholm, Sweden.
Ecofriendly primers based on very short oil novel alkyd—P.P. Chahande; Dr. B. B. Gogte—Department of Oil and Paint Technology—Laxminarayan Institute of Technology—pp. 61-64, Nov. 2007.
Emulsification, drying and film formation of alkyd emulsions—P.K. Weissenborn; A. Motiejauskaite—Progress in Organic Coatings 40 (2000) pp. 253-266 Institute for Surface Chemistry—Stockholm Sweden.
Influence of emulsifier on the formation of alkyd emulsions—G. Ostberg, B. Bergenstahl, M. Hulden—Colloids and Surfaces A Physicochemical and Engineering Aspects (1995) pp. 161-171.

* cited by examiner

*Primary Examiner* — Tae H Yoon
(74) *Attorney, Agent, or Firm* — Lynn B. Morreale

(57) ABSTRACT

The invention relates to a polyester resin which is based on at least one fatty acid, with a zero oil length (0%) or an oil length of between 0 and 35%, with a weight ratio of oxidizable fatty acids (monoacids), relative to the overall fatty acids, of 0 or greater than 0 and ranging up to 1, and which is based on an acid component comprising, in addition to said fatty acid, from 30% to 85% by weight, relative to the total weight of said resin, of rosin and/or of derivatives thereof bearing at least one carboxylic acid function.

17 Claims, 3 Drawing Sheets

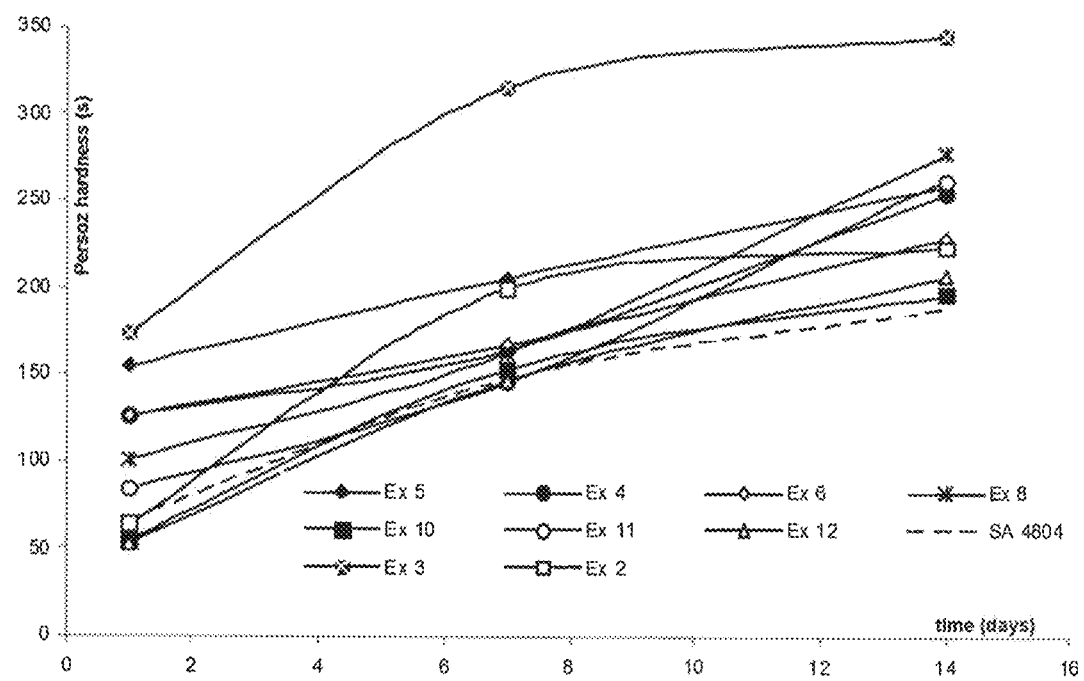
FIG. 1: Development of hardness on varnishes as a function of time, with siccativation with 0.1% of Co metal
(Durham Co 10 WM, 0.1% of cobalt metal on dry binder).

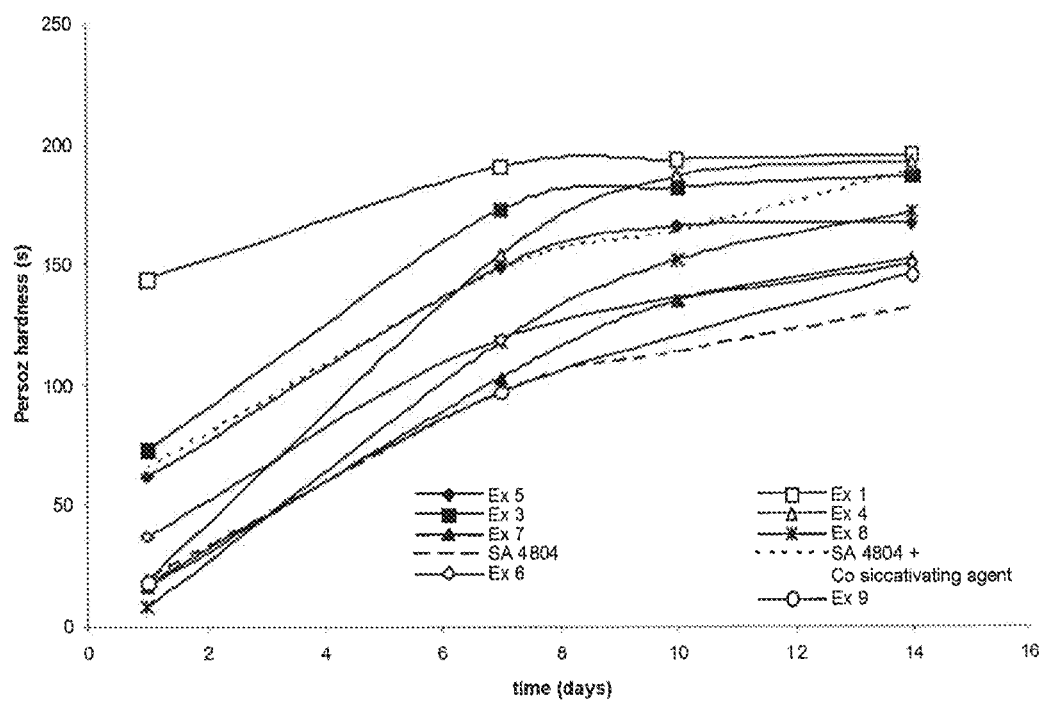
FIG. 2: Development of hardness on varnishes as a function of time, without siccativation.

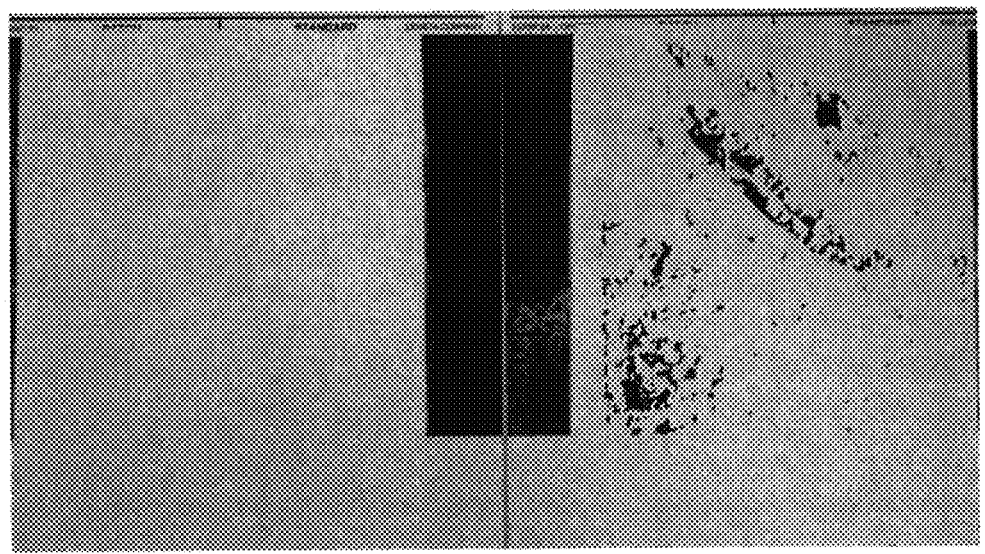
Dispersion according to Example 11
FIG. 3: Test of blocking resistance after 24 hours of drying (Durham Co 10 WM, 0.1% of cobalt metal on dry binder) and 24 hours of contact

POLYESTER RESINS BASED ON FATTY ACIDS THAT HAVE A SHORT OIL LENGTH, AQUEOUS DISPERSIONS AND ASSOCIATED COATINGS

CROSS-REFERENCE TO RELATED APPLICATIONS

This application is a national stage application under 35 U.S.C. §371 of PCT/FR2011/052208, filed Sep. 23, 2011, which claims benefit to FR application FR 1003817, filed on Sep. 27, 2010, which are hereby incorporated by reference in their entirety.

FIELD OF THE INVENTION

The invention relates to a fatty acid-based polyester resin, in particular an alkyd resin, with a short or even zero oil length, modified to a high proportion by rosin or derivatives thereof, a binder composition based on this modified resin, more particularly an aqueous dispersion based on this resin with no presence of organic solvent, and to applications as binder in coatings and in particular in water-based coatings for adhesives, paints, surface coatings, primers or varnishes. This polyester resin, and in particular alkyd resin, uses a high content of starting materials of renewable origin and has specific performance qualities, in particular concerning the development of hardness over time after application and the reduction of yellowing. In particular, the novel resin may be used as binder in decorative or industrial water-based coating compositions capable of curing in air with or without siccativating agent.

BACKGROUND OF THE INVENTION

Alkyds in organic solvent medium, also referred to as being solvent-based, are resins that have been known for a long time to those skilled in the art, and are used in general in decorative and industrial paint formulations and coatings. To satisfy questions as regards comfort of use, odor and toxicity, specific alkyd emulsions have been developed and marketed for about 20 years, with advantageous performance levels in terms of gloss, drying, appearance/color, stability and odor. A technical solution for conventional implementation, employed to form alkyd emulsions that are stable over time, consists in using a combination of a nonionic surfactant with an anionic surfactant as described in WO 2008/076360.

Despite these improvements, certain parameters and performance levels still remain to be improved, such as the resistance to yellowing, the blocking resistance, the hardness, the water sensitivity and the biodegradability. The tendency toward yellowing is a natural and intrinsic property of alkyd resins, which thus limits their use to quite specific end uses, for instance primers, surface coatings, woods and trims. The first alkyd emulsions described in the literature concern alkyds with large oil lengths of about 65% to 82% as described in Colloids Surfaces A. Physicochem. Eng. Aspects 1995, 94, 161-171. The emulsification of resins with a smaller oil length is relatively difficult to perform, due to the lower affinity of surfactants with the resin, as explained in Prog. Org. Coat. 1994, 24, 281-97. Nevertheless, nowadays, commercial products have an average oil length of 50%, as described in WO 2009/140192 or even a smaller oil length up to approximately 40% for the lowest oil lengths, as described in Prog. Org. Coat. 2000, 40, 253-266 or even more recently in WO 2008/076360. For a more systematic and universal use, it is necessary to find solutions that guarantee products which develop less yellowing for applications of wider scope such as on walls or ceilings. Nowadays, these applications are almost exclusively reserved for acrylic emulsions, which have been known for a long time for their good resistance to yellowing and to oxidation, but acrylic emulsions have drawbacks such as lower gloss, water sensitivity (lower water resistance) and poorer chemical resistance.

The resin of the present invention proposes to overcome the mentioned drawbacks of the prior art, while at the same time affording high dispersibility in water without any need for organic solvent and in the absence of groups that make the resin self-dispersing. This capacity makes it possible to obtain resin dispersions without any organic solvent or protective colloids and which are stable on storage, and to obtain coatings associated with high gloss and high hardness, and, by virtue of its hydrophobic nature, high water resistance, such as high resistance to yellowing over time. An additional advantage during the drying of the resin dispersions according to the present invention is the faster development over time of high, stable hardness, this being achieved without the need for systematic addition of a siccativating agent of cobalt type. This therefore leads to an amicable solution for man and for his environment due to the absence of organic solvents in the dispersion and also the absence of siccativating agents on drying, but also via the choice of the essential raw materials, insofar as a large proportion of these raw materials is of renewable and durable origin and may also lead to chemical structures that are more readily biodegradable. The dispersions of the invention and the coatings resulting therefrom are thus favorable toward environmental protection, while at the same time having application qualities that are at the very least identical, if not improved, with respect to conventional water-based coatings. In addition to the environmental protection, the highly renewable nature of said aqueous binders according to the present invention should be underlined, which binders are predominantly prepared from rosin and natural fatty substances. This advantage is appreciable since, in certain cases, the proportion of renewable raw materials reaches a level of 100% on the overall composition of the resin (surfactants excluded). This enables the manufacture of this novel type of resin, which may be used as binder, by virtue especially of the durable and seasonal availability of said raw materials. These same reasons also make it possible to limit the environmental impact via a reduced carbon imprint and an improved life cycle. These two parameters reflect the impact of the manufactured products on the environment and health. "Renewable" or "bio-sourced" resources in particular make it possible to reduce the emissions of greenhouse gases such as carbon dioxide.

SUMMARY OF THE INVENTION

With this aim, the present invention proposes a novel range of polyester resins based on oxidizable and/or non-oxidizable fatty acids, in particular alkyd resins, with a greatly reduced or zero short oil length, for their dispersion in water with the aid of surfactants, and which are capable of substantially curing without the excessive supply of unsaturated fatty oils or acids. These dispersions, which are commonly known as to "emulsions", give, after application to a substrate, coatings that are stable over time and ensure low yellowing evolution and also substantial development of hardness after application and drying, despite having a greatly reduced or zero oil length. The very capacity of certain resins with a very small oil length, in particular from 0 to 15%, to cure strongly and rapidly with the drying time, and above all without the necessary supply of siccativating agent, is a significant advantage in the current environmental context. More particularly, in this context, the use of cobalt-free drying systems is an increasingly important need, given the increasing environmental restrictions on the use of cobalt as a siccativating agent.

More particularly, the resin according to the invention with a zero oil length (0%) or an oil length ranging up to 5% (meaning an oil length ranging from 0 to 5%), in addition to its capacity to be used as a resin for obtaining aqueous dispersions for water-based coatings, as described above, also has the capacity to be used as a binder resin for non-water-based coatings and more particularly for two-pack applications, for example as "coil" coating resins for application to metal sheets. The same performance improvements as with water-based coatings are obtained, especially in terms of hardness and chemical resistance, for example. The non-water-based coatings obtained with a binder resin according to the invention, having a zero oil length (0%) or an oil length ranging up to 5%, give in addition (additional performance) a significant improvement in the adherence to steel and in particular to galvanized steel.

Alkyds are oligomers that are conventionally obtained by polycondensation between diacids and polyols in the presence of a more or less large proportion of "oil" or of "oxidizable unsaturated fatty acids". The diacids and polyols usually used to form the polymer structure are phthalic anhydride, isophthalic acid, pentaerythritol and glycerine (or glycerol). The number-average molecular masses Mn may thus range between 1000 and 10 000 g/mol, as a function of the $OH/CO_2H$ (hydroxy/carboxy) ratio used. Monoacids such as benzoic acid and rosin (mainly and predominantly containing natural resinous acids such as abietic acids including dehydroabietic acid, pimaric acids, mercusic acids and communic acids) may be added to the alkyds as acid component. These components thus make it possible to reduce the oil length and to increase the hardness of the alkyd. On the other hand, reducing the oil length makes the resin less readily dispersible in water with surfactants and above all without the aid of solvent. According to Paintindia, November 2007, 61-65, it is essential to use organic solvent in order to facilitate the dispersion in water, but the presence of such an organic solvent is incompatible with environmental protection as demanded in the present invention. By reducing the oil length of certain alkyds, we have found, unexpectedly, that the rosin used under the conditions of the invention considerably facilitates the development over time of the hardness of the coatings, in particular alkyd coatings, thus formed during oxidative drying also known as siccativation and also is facilitates the aqueous dispersion of the resin without any need for organic solvent or protective colloid. The hardness associated with the observed curing of the resin increases over time after application of the coating composition and offers an excellent final hardness to the film, which is markedly superior to those recorded for conventional alkyd emulsions, with oil lengths usually of between 40% and 85%.

The invention relates firstly to a polyester resin based on fatty acids, which is short in oil or of zero oil length, modified with rosin and/or derivatives thereof. These resins may be used as organic binders in aqueous dispersion for water-based coatings. More particularly, the resin with a zero oil length (0%) or with an oil length ranging up to 5% may also be used as organic binder for two-pack (2K) non-water-based coatings, in particular for "coil" or metal sheet and preferably for galvanized steel.

Next, the invention relates to an organic binder composition comprising at least one modified resin as described above and more particularly comprising, in addition to this modified resin, at least one second resin different from the first one and selected from polyesters based on fatty acids.

The third subject of the invention concerns an aqueous dispersion of resin comprising at least one modified resin as defined according to the first subject of the invention or at least one organic binder composition as defined according to the second subject of the invention.

Another subject of the invention concerns a process for preparing an aqueous dispersion, as defined according to the third subject of the invention.

The invention also covers a coating composition which comprises at least one modified resin as defined according to the first subject of the invention or at least one organic binder composition as defined according to the second subject of the invention or at least one aqueous dispersion as defined according to the third subject of the invention.

The invention also relates to the use of the modified resins according to the first subject or of the organic binder compositions according to the second subject or of the aqueous dispersions according to the third subject of the invention, as binder in coating compositions.

Finally, the invention relates to the use of the modified resins according to the first subject with a zero oil length or with an oil length ranging up to 5%, as organic binder in non-water-based coatings based on a two-pack reactive system, more particularly for "coil" applications on metal sheets.

DETAILED DESCRIPTION OF CERTAIN EMBODIMENTS OF THE INVENTION

FIG. 1 is a graph depicting the development of hardness on varnishes as a function of time, with siccativation.

FIG. 2 is a graph depicting the development of hardness on varnishes as a function of time, without siccativation.

FIG. 3 depicts differences in blocking resistance between a dispersion prepared according to Example 11 and a reference resin.

Thus, the first subject of the invention relates to a polyester resin, in particular an alkyd resin, which resin:
  is based on at least one fatty acid
  has a zero oil length (0%) or an oil length between 0 and 35%, preferably greater than 0 and up to 25%, more preferentially up to 15%
  has a weight ratio of oxidizable fatty acids (monoacids) relative to the overall fatty acids of 0 or more than 0 and ranging up to 1
  is based on an acid component comprising, in addition to said fatty acid, from 30% to 85%, preferably from 35% to 75%, more preferentially from 40% to 75% and even more preferentially from 45% to 75% by weight, relative to the total weight of said resin, of rosin and/or rosin derivatives bearing at least one carboxylic acid function, and more particularly for its maleinized derivatives (maleinized rosin derivatives), bearing from 3 to 4 carboxylic functions.

According to a preferred embodiment, the resin of the invention comprises less than 5%, preferably less than 3% by weight and more preferentially no (0%) aromatic compound, for instance of phthalic type (phthalic, isophthalic, trimellitic or terephthalic acid or anhydride), besides the rosin derivatives that may be used. The term "rosin derivatives" means natural derivatives such as dehydroabietic acid.

The resin of the invention is, according to another preferred case, based on an acid component comprising, in addition to said fatty acid, in addition to said rosin and/or in addition to said rosin derivatives, at least one acid compound containing at least one carboxylic acid function and having an overall functionality of 2 to 3, the overall functionality including the acid function and another possible function, said compound being chosen from: saturated polyacids or ethylenically unsaturated polyacids or hydroxy acids. The saturated polyacids have no ethylenic unsaturation that is reactive during their use and may very well be derived from unsaturated polyacids, containing at least one reactive unsaturation, by hydrogenation of these unsaturated polyacids. More particularly, the resin of the invention may be based on an acid component which comprises at least two from among said acid compounds, with at least one chosen from saturated polyacids and another chosen from unsaturated polyacids, this being in addition to said fatty acid and said rosin and/or said rosin derivatives. As saturated polyacid that is suitable for use according to the invention, the choice may be made from the acid and/or the anhydride corresponding to: succinic acid of functionality 2, adipic acid of functionality 2, sebacic acid of functionality 2, dodecanedioic acid of functionality 2, citric acid of functionality 3, the $C_{36}$ fatty acid dimer of functionality 2 to 2.2 or the $C_{54}$ fatty acid trimer of functionality 2.5 to 3. As unsaturated polyacid that is suitable for use, the choice may be made from the existing acid and/or anhydride corresponding to: itaconic acid of functionality 2, maleic or fumaric acid of functionality 2 or tetrahydrophthalic acid (THP) of functionality 2. Among the preferred polyacids, mention may be made of polyacids comprising at least one $C_{36}$ fatty acid dimer and/or $C_{54}$ fatty acid trimer. As defined above, said acid compound, containing at least one carboxylic function and having an overall functionality of 2 to 3, may also be chosen from hydroxy acids that may thus be present in said acid component in addition to the fatty acids and the rosin and derivatives thereof. As preferred hydroxy acids that may thus be present, mention may be made of glycolic acid or lactic acid.

A combination of several polyacids and monoacids is often used in order to optimize the physicochemical properties of the resin, in particular of the alkyd, and more particularly to obtain the desired hardness/suppleness compromise. The incorporation into the resins according to the invention, in particular into the alkyds, of aromatic acid derivatives such as phthalic derivatives (diacid/anhydride) or benzoic derivatives (monoacid) is possible, but preferably with a content of less than 5% by weight and more preferentially with less than 3% by weight. Even more preferentially, there is no aromatic derivative (0% aromatics) besides any possible natural rosin derivatives as described above. The presence of a monoacid component such as abietic or pimaric acids, in particular of rosin and/or derivatives thereof, and more particularly in such a high proportion, constitutes the essential element of the invention for enabling the particular properties observed. The rosin content is high and ranges from 30% to 85%, preferably from 35% to 75%, more preferentially from 40% to 75% and even more preferentially from 45% to 75%. The fatty acids used, given their natural origin, are mixtures comprising saturated fatty acids, unsaturated fatty acids containing non-conjugated unsaturations and unsaturated fatty acids containing conjugated unsaturations. These fatty acids, and also to fatty acid dimers and/or trimers synthesized from these same natural fatty acids, afford the suppleness and flexibility necessary for the binder and the coating obtained which results therefrom.

The term "fatty acid" defined in the broadest sense means a $C_{12}$ to $C_{54}$ carboxylic acid.

The term "oil length", as used in the present invention, means the weight percentage, relative to the total weight of the resin, of the weight of "fatty monoacids" or of oils or stand oil derivatives (stand oil is a product resulting from the reaction at high temperature, 250-300° C., of a mixture of oil and fatty acid), this weight percentage being expressed as a weight equivalent of triglyceride derivatives (oils) which correspond to the fatty acids, said fatty acids being "oxidizable". Any calculation or mention of this characteristic in the present invention is based on this definition. The term "oxidizable fatty acids" means, according to the present invention, fatty acids or derivatives (oils or stand oils) with an iodine number of greater than or equal to 80 mg of iodine per g of product. Said monoacids or triglycerides (oils) may be mixtures of natural origin, comprising up to 30% by weight of saturated fatty acids.

Preferably, the proportion of oxidizable (air-reactive) unsaturation in the resin of the invention is zero (0) or is greater than 0 and ranges up to 0.25 and preferably up to 0.15 mmol of oxidizable double bonds per gram of dry resin (undiluted).

According to a particular possibility, the resin of the invention is based on an alcohol component comprising at least one polyol of functionality ranging from 2 to 10 and preferably from 3 to 6. The polyols that are suitable for use according to the invention may be selected from: ethylene glycol, polyethylene glycol, preferably with a number-average molecular mass Mn ranging from 300 to 6000, propylene glycol (1,2-propanediol), 1,3-propanediol, dipropylene glycol, triethylene glycol, glycerol, diglycerol, trimethylolpropane or trimethytolethane, pentaerythritol, dipentaerythritol, sorbitol, mannitol, methyl glucoside, polyglycerol, in particular glycerol oligomers, such as Polyglycerol-3 (glycerol trimer) and decaglycerol and, preferably, glycerol oligomers and mixtures thereof, such as Polyglycerol-3, which Polyglycerol-3 is a mixture of glycerol oligomers (glycerol oligomerized in the presence of oligomers containing 30% to 55% by weight of glycerol trimer constituting the predominant oligomer), this product being sold by Solvay. The polyol that is most preferred is polyglycerol-3 which is oligomerized and has a molecular mass markedly greater than that of glycerol, with a functionality ranging from 5 to 6. By virtue of its higher molecular mass and of its high functionality, this polyol makes it possible more readily to increase the final molecular mass of the resin, in particular of the alkyd resin, while at the same time ensuring a narrower molecular distribution.

The preferred resin of the invention has an acid number of less than 8 and a number-average molecular mass Mn ranging from 1000 to 10 000 g/mol, measured by GPC in THF and expressed as polystyrene equivalents.

The Tg of the resin of the invention measured by DSC, after two passages at a temperature sweep speed of 10° C./min, may range from −40 to 50° C. and preferably from −20 to 35° C.

More particularly, according to a first version, the resin has an oil length that is between 0 and 35%, and is preferably greater than 0 and ranges up to 25% and more preferentially up to 15%, with presence of at least one oxidizable fatty acid (monoacid). This means that the resin comprises an air-oxidizable structure. According to a more particular case of this oxidizable resin version, the content of oxidizable unsaturation in said resin is greater than 0 and may range up to 0.25 and preferably up to 0.15 mmol of oxidizable double bonds per gram of dry resin. In such a case (resin of oxidizable structure), said fatty acid is selected from fatty monoacids of plant or animal origin preferably of $C_{16}$ to $C_{24}$, with a mean iodine number ranging from 100 to 200.

According to the given definition of the invention, the fatty acid may be an oxidizable fatty acid (fatty monoacid) or a non-oxidizable fatty acid, in particular a polyacid such as fatty acid oligomers and in particular $C_{36}$ and $C_{54}$ fatty acid dimers and/or trimers, respectively. Said fatty acid may be oxidizable and selected from fatty acids of soybean oil, sunflower oil, tall oil (TOFA), castor oil, dehydrated castor oil, linseed oil or rapeseed oil, said fatty acids being used as such or in the form of corresponding oils (triglyceride esters) of fatty acids or in the form of corresponding stand oils of fatty acid oils. Said stand oils, which are well known to those skilled in the art, are in fact derivatives of fatty acid oils obtained at high temperature by standolization of these oils. These cases of fatty acids or of fatty acid oils have oxidizable unsaturations as defined above according to the iodine number characteristic of greater than or equal to 80 mg of iodine per gram of produced acid or oil or stand oil of fatty acid oil.

According to a preferred version of the resin of the invention, it is based on a polyacid comprising at least one $C_{36}$ fatty acid dimer and/or $C_{54}$ fatty acid trimer and based in on a polyol comprising at least one glycerol and/or pentaerythritol and/or dipentaerythritol oligomer, preferably a mixture of glycerol oligomers comprising the glycerol trimer, more particularly polyglycerol-3.

According to a more particular version, the polyester resin of the invention is an alkyd resin, with an oil content (oil length) of greater than 0%, preferably ranging up to 25% and more preferentially up to 15%.

Another category of resin according to the invention has a zero oil length or oil content (0%) and is commonly referred to as being "oil-free", with said fatty acid being selected from non-oxidizable fatty acids and thus with a corresponding content of oxidizable unsaturation that is 0 mmol per gram of dry resin. In this case, said fatty acid is preferably selected from saturated fatty acids (including fatty acids that are initially oxidizable, which have been hydrogenated and consequently become non-oxidizable) or from fatty acid oligomers, preferably $C_{36}$ dimers (including hydrogenated dimers) and/or $C_{54}$ trimers (including hydrogenated trimers). Preferably, such a resin (0% oil) is based on an alcohol component comprising as polyol a glycerol oligomer, preferably a mixture of glycerol oligomers, and more preferentially polyglycerol-3, and, as fatty acid, a $C_{36}$ fatty acid dimer and/or a $C_{54}$ fatty acid trimer (hydrogenated or non-hydrogenated). A resin with comparable behavior, in particular for applications in a two-pack coating system, is also a resin with an oil content ranging up to 5%, which, in addition to said fatty acid selected from the non-oxidizable fatty acids as defined above, comprises (in addition) minor weight proportions of an oxidizable fatty acid leading to said oil proportion ranging up to 5%. Said oxidizable fatty acid, which is minor in the latter case, may be present as residual acid with the rosin used: for example, "tall oil" rosin comprises small proportions (about 4%) of tall oil fatty acid, which is oxidizable. Thus, as in this particular case, said oxidizable acid may also be present or added in such minor proportions to arrive at an oil length that may be up to 25%.

The preparation of said resin according to the invention, in particular the alkyd, is performed by polycondensation reaction under an inert atmosphere at standard temperatures of between 180° C. and 300° C., preferably between 250° C. and 270° C., and more preferentially with application of a vacuum (reduced pressure) of moderate level ranging from 50 to 250 mmHg, at the end of the polycondensation in order to reduce the reaction times. It is possible, in order to prevent and/or further reduce the coloration and oxidation of the rosin during the synthesis, to use additives, in particular antioxidants, as employed in the preparation of rosin esters used in particular for adhesives: phenol sulfites, paraformaldehyde, hypophosphorous acid, trialkyl or triphenyl phosphites. A more exhaustive list of additives that may be used for this purpose is described in U.S. Pat. No. 4,744,925, column 2, lines 50-62, which list is incorporated herein by reference.

The second subject of the invention is thus an organic binder composition which comprises at least one resin as defined above according to the invention.

According to a more preferred case, this composition comprises at least two resins and, more precisely, in addition to the first resin as defined according to the invention above, it comprises at least one second resin different from the first, and with this second resin being selected from resins of polyesters based on fatty acids, preferably from modified alkyd resins. Thus, preferably, said polyesters based on fatty acids are chemically modified alkyds chosen from: silicone alkyds, urethane alkyds, alkyd-acrylic hybrids. These binder compositions may be used as such or in the preparation of the aqueous dispersions of resins of the invention, for water-based coatings.

According to a particular variant of this organic binder composition, which is well suited to non-water-based or solvent-based coatings and more particularly for two-pack (2K) reactive systems, even more particularly for "coil" coatings on metal sheets, said first resin is a resin according to the invention and has a zero oil length (0%) or an oil length ranging up to 5%.

The third subject of the invention is an aqueous dispersion of resin which comprises at least one resin or at least one binder composition as defined above according to the present invention. According to a particular preferred variant of this aqueous dispersion according to the invention, it comprises, in addition to said resin or said binder composition, both as defined according to the invention described above, at least one surfactant selected from: at east one anionic surfactant and at least one nonionic surfactant or at least one surfactant of mixed structure and with an overall weight content relative to said resin ranging from 2% to 15% and preferably from 5% to 10%. According to the present invention, a surfactant of mixed structure is a surfactant which comprises both a nonionic structure, such as a polyoxyalkylene segment (more particularly oxyethylene and/or oxypropylene units) and an anionic structure (for instance a sulfonate or sulfate or phosphate or phosphinate group) on the same molecule or molecular chain. Examples of such surfactants that may be mentioned include sulfonate or sulfate or phosphate phosphinate esters of polyether alcohols or of alkoxylated fatty alcohols, with nonionic structures (polyether) and anionic structures (sulfate, sulfonate or phosphate or phosphinate), combined on the same molecule.

The dispersion according to the invention may have a solids content ranging from 30% to 70% and preferably from 40% to 60% and a mean particle size ranging from 100 to 500 nm. The preferred dispersion according to the invention is free of any organic solvent, this meaning, according to the present invention, a corresponding content of volatile organic compounds (VOC) in said dispersion of less than 1000 ppm, preferably less than 500 ppm and more preferentially less than 100 ppm.

Even more particularly, the aqueous dispersion of resin according to the present invention is a mixture of, or comprises as a mixture, a first aqueous dispersion of resin as defined according to the invention as described above and at least one second dispersion of resin, which second dispersion is different from the first dispersion, this second dispersion of resin being selected from dispersions of alkyds, which are optionally modified, or acrylic, including styrene-acrylic, dispersions (or emulsions), or dispersions of other polymers and in particular dispersions of saturated or unsaturated polyesters, or polyurethanes. According to this particular case of aqueous dispersion, the weight content of said first dispersion ranges from 50% to 99.5%. Said modified alkyd dispersions that may be suitable for said second dispersion, according to this particular case, are chosen from alkyd dispersions modified with acrylic, styrene, styrene-acrylic, vinyl, silicone or urethane. Said second dispersion is also selected so as to be compatible with the first aqueous dispersion as defined according to this particular dispersion case and, more particularly, it is based on a resin or a polymer that is compatible with the resin of the present invention, which resin has as specificity a greatly reduced or zero oil length.

A fourth subject of the invention concerns a process for preparing said aqueous dispersion, which process comprises a step of emulsification at a temperature of from 30 to 90° C. and preferably from 50 to 85° C. of at least one resin and/or of at least one organic binder composition, the resin and the binder composition as defined above according to the invention, by phase inversion in a reactor stirred via a dual-flow stirring system.

In point of fact, the resins, after the final polycondensation phase, are cooled to 80° C. and are then transferred into an emulsifier in order to be dispersed therein in water in the presence of surfactants. The emulsion is preferably obtained via the phase inversion technique using a reactor stirred via a dual-flow system at a temperature of between 30° C. and 90° C. and preferably at 50-85° C. The direct emulsification technique is incompatible with this type of resin. The temperature imposed during the phase inversion is adjusted as a function of the intrinsic viscosity at elevated temperature of the alkyd or polyester resin. The resin is emulsified, at neutral or slightly alkaline via more or less partial neutralization of the residual carboxylic functions, according to a standard process combining a surfactant or, preferably, a mixture of ionic (anionic) surfactant and of nonionic surfactant. For these two types of process, at least one surfactant is used. This surfactant is selected from ionic, preferably anionic, and/or nonionic and/or hybrid surfactants of mixed structure (comprising in the same molecule a nonionic structure such as an ethoxylated and/or propoxylated structure and an anionic structure). The presence of surfactants improves the stability of the dispersion, thus preventing sedimentation and/or coalescence during the hot forming process and during the storage/use of the product. A selection criterion for the nonionic surfactants used is the HLB index (hydrophilic-lipophilic balance) representing the ratio of hydrophilic and hydrophobic characters in the surfactant. Preferably, a combination of a nonionic surfactant and of an anionic surfactant is preferred to obtain stable dispersions with a small particle size, preferably less than 300 nm. Among the anionic surfactants that are suitable for this invention, mention may be made of sodium, lithium, potassium, ammonium or magnesium salts, alkyl ether sulfates with alkyl ranging from $C_8$ to $C_{18}$ or $C_{12}$ alkyl benzene sulfates or alkyl sulfates, alkyl phosphate or dialkyl sulfosuccinate esters or even soaps obtained from the corresponding fatty acids. The anionic surfactants are preferably used with at least one nonionic surfactant. Examples of mixed surfactants (nonionic+anionic mixed structure) include alkoxylated alkyl phenol sulfonates or phosphonates. The nonionic surfactants may be used alone, but, preferably, they are in combination with an anionic surfactant. As preferred examples of suitable nonionic surfactants, mention may be made of: ethoxylated $C_{12}$-$C_{18}$ fatty alcohols (6 to 50 OE), ethoxylated iso $C_{10}$ fatty alcohols (6 to 50 OE), ethoxylated mono-branched $C_{10}$-$C_{18}$ fatty alcohols (6 to 50 OE), sorbitol fatty esters, ethoxylated sorbitol esters (5-50 OE), alkyl polyglucosides, glucamides, glycerol, diglycerol or polyglycerol fatty esters, ethoxylated fatty acids (7-100 OE), ethoxylated castor oil (hydrogenated or non-hydrogenated) (30-40 OE), glycol or polyethylene glycol fatty acids, nonionic polymers and other block copolymers, for instance poly(propylene glycol)-poly(ethylene glycol) block copolymer. The preferred aqueous dispersion comprises at least one nonionic surfactant optionally combined with at least one anionic surfactant in an overall (nonionic plus anionic) weight content relative to the alkyd or polyester resin of from 2% to 15%, preferably from 5% to 10%, and with a preferred ionic to nonionic weight ratio ranging from 25/75 to 50/50 in the case of a nonionic and anionic combination. The pH of the medium is preferably adjusted as a function of the acidity of the resin. This is why a basic aqueous solution, of from 1% to 50% and preferably from 10% to 20% by weight of base, is initially introduced after the addition of the surfactants, at the emulsification temperature (cf. table 4). To this end, basic (alkaline) aqueous solutions are used starting with LiOH, NaOH, KOH, aqueous ammonia or amines, preferably tertiary or hindered amines that are more or less hydrophilic, such as diethanolamine, triethanolamine, aminomethylpropane or triethylamine.

The aqueous dispersion of the resin may also be obtained by self-emulsification of the resin without surfactant, for a resin with an acid number of at least 40 mg KOH/g, after at least partial neutralization of the carboxylic functions of the resin. However, in the context of the present invention, it is preferable for the acid number to be <8 in order to have the best water resistance for the resulting final coating.

The aqueous dispersion according to the invention is preferably free of any protective colloid.

The dry extracts or solids contents of said dispersions of the invention range from 30% to 70%, preferably from 40% to 60% and more preferentially from 40% to 55%.

Another subject of the invention relates to a coating composition which comprises as binder at least one resin or at least one binder composition or at least one aqueous dispersion, with said resin or binder composition or aqueous dispersion being as defined above according to the invention. According to a more particular and preferred case, said composition is a water-based coating composition. Said coating is preferably selected from decorative or industrial coatings, and in particular, for industrial coatings, chosen from anticorrosion coatings, and preferably from water-based coatings for adhesives, paints, surface coatings, primers and varnishes. The preferred coating is selected from decorative or industrial water-based varnishes or paints. These water-based coating compositions and in particular paints and varnishes have the additional advantage of drying without mandatorily supplying (or at a reduced level) a siccativating agent.

The coating composition based on aqueous dispersions may also comprise a siccativating agent, which may be present in a reduced or zero content (normal), and in this case said resin used as binder preferably has an oil length ranging up to 25% and preferably from 15% to 25%. Given their appropriate molecular masses and oil length, said resins in particular with an oil content ranging from 15% to 25%, under the effect of a siccativating agent such as cobalt, allow, in addition to high hardness and great resistance to yellowing, excellent blocking resistance, with no point of attachment or of peeling observed in a test, after drying for 24 hours at room temperature and 24 hours of contact. Such blocking resistance performance is expected only for certain acrylic dispersions, but is entirely exceptional for polyester dispersions, in particular alkyd dispersions, as described in the present invention.

Moreover, the presence of hydroxyl functions in the resins defined according to the invention makes it possible to produce, for applications termed industrial, crosslinks by means of a second component (two-pack system known as 2K) such as isocyanates (blocked or non-blocked) or melamines to form films with a higher molecular weight leading to superior mechanical or chemical properties: chemical resistance and mechanical strength such as increased longevity and durability.

The coating composition according to the present invention also covers a coating composition which comprises as binder at least one resin as defined above according to the invention and having a zero oil length (0%) or a resin having an oil length ranging up to 5% as defined above or at least one binder composition based on such a resin (zero oil length or oil length ranging up to 5% as defined above). This particular coating composition more particularly concerns an anticorrosion protective coating of great chemical resistance for coil applications. More particularly, such a coating composition may be used in a two-pack (2K) reactive system.

A penultimate subject of the invention relates to the use of at least one resin or of at least one binder composition or of at least one aqueous dispersion, as defined above according to the invention, as binders in coatings. More particularly, this use relates to decorative or industrial water-based coatings selected from adhesives, paints, surface coatings, primers or varnishes. These coatings are suitable for substrates selected from: wood, metals, plaster, concrete, composites or plastics, plastics such as silicone, polyethylene, PVC, polycarbonate, polypropylene or polystyrene.

A more particular use concerns resin with a zero oil length or with an oil length ranging up to 5%, as defined above according to the invention or the corresponding binder composition or aqueous dispersion (comprising said resin), this use being as a binder for two-pack (2K) reactive systems in coil coatings, for marine applications or as anticorrosion for protecting metals (metal surfaces).

Moreover, the high hydrophobicity and the excellent adhesion, which are qualities afforded by said resins in aqueous dispersion according to the present invention, make it a preferred binder that may be used equally well in coatings in aqueous and non-aqueous medium for preventing the corrosion of metal surfaces. Among the other substrates is selected, wood may also be found, it being noted that the hydrophobic nature and the presence of "rosin" units derived from the wood, offer excellent properties of adhesion to wood. Surprisingly, we have also found, by chance, that these binders also had high properties of adhesion to plastics such as silicone, polyethylene, ABS, polycarbonate or PVC, or to plaster, ceramic, brick or composite materials. The coating compositions formulated with at least one aqueous dispersion of said resin may contain a significantly reduced or even zero content of at least one siccativating agent. Preferably, these compositions may be free of siccativating agents and in particular free of cobalt as siccativating agent. Similarly, by virtue of its high potential for physical drying, slightly larger coating thicknesses would be allowed for equivalent drying times, thus increasing the productivity and also improving the conditions and working intervals (shortened interval) for the handling and use of coated pieces, after coating.

The final subject of this invention relates to substrates coated with at least one (substrate) coating, obtained from at least one resin or from at least one binder composition or from at least one aqueous dispersion of resin or from at least one coating composition derived from said resin, as defined above according to the present invention. In certain applications with a high concentration of fillers and in a two-pack system, supplying a siccativating agent based on cobalt, manganese, lead, vanadium, calcium, barium, strontium, cerium, zinc and iron is unnecessary. Already, given the physical drying performance demonstrated by the compositions based on resin of reduced oil length, in particular from 0 to 15%, the presence of siccativating agent is in no way essential with such a coating composition.

EXPERIMENTAL SECTION

By way of illustration of the invention, the following examples describe, without any limitation on the claimed subjects, the synthesis of said resins for binders, in particular water-based, and the performance of the dispersions and of the coatings thus obtained. An illustration of the performance in a two-pack (2K) system is also presented at the end of the experimental section.

1) Raw Materials Used (see Table 1 Below)

TABLE 1

Raw materials used for the preparation of the tested resins

| Commercial name or product type | Supplier | Chemical name | Function | Iodine number (mg $I_2$/g) | Acid or hydroxyl number (mg KOH/g) |
|---|---|---|---|---|---|
| Nouracid ® SZ35 | Oleon | Soybean fatty acid | Fatty acid | 120-150 | 195-205 |
| SYLFAT ® 2 | Arizona | Tall oil fatty acid | Fatty acid | 155 | 194 |
| Pripol ® 1009 | Croda | Fatty acid dimer | Polyacid | / | 195-205 |
| Pripol ® 1017 | Croda | Mixture of fatty acid dimers and trimers (75/25) | Polyacid | / | 195-210 |

TABLE 1-continued

Raw materials used for the preparation of the tested resins

| Commercial name or product type | Supplier | Chemical name | Function | Iodine number (mg $I_2$/g) | Acid or hydroxyl number (mg KOH/g) |
|---|---|---|---|---|---|
| Itaconic acid | Acros Organics | Itaconic acid | Polyacid | / | 860 |
| Rosin of Chinese *Pinus massoniana* type | TER-HELL & CO GMBH | Pine oil rosin, with a content of resinous acids ~90% | Rosin | / | 165-175 |
| FOR85 | Forchem | Tall oil rosin, resinous acids: >85% | Rosin | / | 165-175 |
| Hydrogral ® | DRT | Hydrogenated rosin Resinous acids: ~89% | Rosin | / | 163 |
| Succinic acid | Aldrich | Succinic acid | Polyacid | / | 950 |
| Sebacic acid | Aldrich | Sebacic acid | Polyacid | / | 550 |
| Polyglycerol-3 | Solvay | Polyglycerol (mixture of oligomers, centered on 35-55% trimers) | Polyol | / | 1000-1200 |
| Pentaerythritol | Perstorp | Pentaerythritol | Polyol | / | 1645 |
| Glycerol | Cargill | 1,2,3-Propanetriol | Polyol | / | 1828 |
| AOX-R | Alladchem | 4,4'-Thiobis(3-methyl-6-tert-butylphenol) (CAS 96-69-5) | Antioxidant | — | — |
| Zephrym ® 3300 | CRODA | Ammonium dodecylbenzenesulfonate | Anionic surfactant | | |
| Atlas ® G5000 | CRODA | Propylene oxide/ethylene oxide block copolymer | Nonionic surfactant | | |
| Synaqua ® 4804* | Cray Valley | Short-oil (37%) alkyd resin as a dispersion in water (solids content: 50%) | Reference resin | | |
| Synolac ® 9605 S 65 | Cray Valley | Polyester resin for general "coil" application | Reference resin | | |
| BORCHI ® OXY-COAT | OMG-BORCHERS | Iron complex dissolved in propylene glycol | Siccativating agent | | |
| DURHAM ® COBALT 10WM | ROCKWOOD PIGMENTS | Cobalt complex dissolved in a dearomatized hydrocarbon-based solvent | Siccativating agent | | |
| ACTICIDE ® MBS | THOR CHEMIE | Aqueous solution of methylisothiazoline (MIT) and of benzisothiazolinone (BIT) | Biocide | | |
| DISPERBYK ® 190 | BYK CHEMIE | Block copolymers containing groups with high affinity for pigments | Dispersant | | |
| BYK ® 022 | BYK CHEMIE | Polysiloxane base antifoam | Antifoam | | |
| TIONA ® 595 | CRISTAL GLOBAL | Titanium dioxide | Pigment | | |
| AQUAFLOW ® NMS 450 | AQUALON-HERCULES | Hydrophobically modified polyacetal polyether | Thickener | | |
| AQUAFLOW ® NHS 300 | AQUALON-HERCULES | Modified polyacetal polyether | Thickener | | |

*Symbolized as SA4804 in FIGS. 1 and 2

2) Preparation of the Starting Resins 13 resins were prepared according to the corresponding procedures described below in Examples 1 to 13.

Example 1

185.2 g of Pripol® 1009, 1453.3 g of pine oil rosin, 6 g of AOX-R (phenol sulfite) and 185.2 g of polyglycerol-3 are placed in a stirred, temperature-regulated 5-liter reactor, under a nitrogen atmosphere. The mixture is heated to 250-270° C. and the water of condensation is removed until an acid number of 6 mg KOH/g is obtained.

Example 2

The same procedure as tor Example 1 is used with the following products and amounts: 592.0 g of Pripol® 1009, 1034.0 g of pine oil rosin, 6 g of AOX-R (phenol sulfite) and 374.0 g of polyglycerol-3. The water of condensation is removed until an acid number of 4 mg KOH/g is obtained.

Example 3

The same procedure as for Example 1 is used, but with the following products and amounts: 6.5 g of soybean fatty acid Nouracid® SZ35, 71.4 g of pine oil rosin and 22.0 g of polyglycerol-3. The water of condensation is removed until an acid number of 4 mg KOH/g is obtained.

Example 4

85.0 g of tall oil fatty acid, 837.0 g of tall oil rosin (For 85), 84.0 g of succinic acid and 264.9 g of polyglycerol-3 are placed in a stirred, temperature-regulated 2-liter reactor, under a nitrogen atmosphere. The mixture is heated to 250-270° C. and the water of condensation is removed until an acid number of less than 6 mg KOH/g is obtained.

Example 5

The same procedure as for Example 4 is used, but starting with the following amounts: 9.3 g of soybean fatty acid, 64.2 g of pine oil rosin, 5.2 g of succinic acid and 22.0 g of polyglycerol-3. The mixture is heated to 250-270° C. and the water of condensation is removed until an acid number of less than 4 mg KOH/g is obtained.

Example 6

9.5 g of soybean fatty acid, 65.6 g of pine oil rosin and 21.2 g of polyglycerol-3 are placed in a stirred, temperature-regulated 0.25 liter reactor, under a nitrogen atmosphere. The mixture is heated to 250-270° C. and the water of condensation is removed until an acid number of less than 2-3 mg KOH/g is obtained. Next, 3.25 g of itaconic acid are added at 150° C. and the mixture is heated at 180° C. until a final acid number of 8 mg KOH/g is obtained.

Example 7

139.6 g of soybean fatty acid Nouracid® SZ35, 868.2 g of pine oil rosin, 83.6 g of succinic acid, 68.1 g of sebacic acid and 340.5 g of polyglycerol-3 are placed in a stirred reactor as in Example 4. The mixture is heated to 250-270° C. and the water of condensation is removed until an acid number of less than 6 mg KOH/g is obtained.

Example 8

116.5 g of soybean fatty acid Nouracid® SZ35, 801.5 g of tall oil rosin, 67.6 g of succinic acid and 264.9 g of polyglycerol-3 are placed in a stirred reactor as in Example 4. The mixture is heated to 250-270° C. and the water of condensation is removed until an acid number of less than 7 mg KOH/g is obtained. 16.5 g succinic acid are then added and the condensation is continued until an acid number of 5.5 mg KOH/g is obtained.

Example 9

180.0 g of SYLFAT® 2 (tall oil fatty acid), 770.0 g of pine oil rosin, 69.0 g of succinic acid and 273.9 g of polyglycerol-3 are placed in a stirred reactor as in Example 4. The mixture is heated to 250-270° C. and the water of condensation is removed until an acid number of less than 7 mg KOH/g is obtained. Next, 22.8 g of succinic acid are added and the condensation is continued until an acid number of 4 mg KOH/g is obtained.

Example 10

220.0 g of SYLFAT® 2 (tall oil fatty acid), 664.0 g of pine oil rosin, 73.6 g of succinic acid, 255.9 g of Pripol® 1017 (75/25 fatty acid dimer/trimer mixture) and 255.9 g of polyglycerol-3 are placed in a stirred reactor as in Example 4. The mixture is heated to 250-270° C. and the water of condensation is removed until an acid number of less than 5 mg KOH/g is obtained.

Example 11

224.0 g of SYLFAT® 2 (tall oil fatty acid), 630.0 g of pine oil rosin, 35.0 g of sebacic acid, 69.0 g succinic acid and 273.9 g of polyglycerol-3 are placed in a stirred reactor as in Example 4. The mixture is heated to 250-270° C. and the water of condensation is removed until an acid number of less than 7 mg KOH/g is obtained. Next, 17.8 g of succinic acid are added and the condensation is continued until an acid number of 3 mg KOH/g is obtained.

Example 12

270.0 g of SYLFAT® 2 (tall oil fatty acid), 520.0 of pine oil rosin, 47.5 g of sebacic acid, 69.0 g of succinic acid and 273.9 g polyglycerol-3 are placed in a stirred reactor as in Example 4. The mixture is heated to 250-270° C. and the water of condensation is removed until an acid number of less than 7 mg KOH/g. Next, 17.8 g of succinic acid are added and the condensation is continued until an acid number of 3-4 mg KOH/g is obtained.

Example 13

310 g SYLFAT® 2 (tall oil fatty acid), 475 g of pine oil rosin, 69.0 g of succinic acid, 78.1 g of sebacic acid and 273.9 g of polyglycerol-3 are placed in a stirred reactor as in Example 4. The mixture is heated to 250-270° C. and the water of condensation is removed until an acid number of 3 mg KOH/g is obtained.

The compositions of the 13 resins prepared according to Examples 1-13 are presented in Table 2 and the corresponding physicochemical characteristics are given in Table 3 below.

Additional Examples 14 to 17 of Polyester Resins for "Coil" Two-Pack Use

Example 14

444.0 g of Pripol® 1009, 775.5 g of hydrogenated rosin (Hydrogral®), 6.0 g of AOX-R (phenol sulfite) and 280.5 g of polyglycerol-3 are placed in a stirred, temperature-regulated 2-liter reactor, under a nitrogen atmosphere. The mixture is heated to 250-270° C. and the water of condensation is gradually removed until an acid number of 6 mg KOH/g is obtained. The resin is then cooled and dissolved in a mixture of Solvarex® 9 (from TOTAL)/butyl glycol (80/20, m/m) until a final solids content of 70% is obtained. The viscosity of the solution obtained is between 2000 and 3000 mPa·s.

Example 15

555.0 g of Pripol® 1009, 753.2 g of hydrogenated rosin (Hydrogral®), 6.0 g of AOX-R (phenol sulfite) and 191.9 g of pentaerythritol are placed in a stirred, temperature-regulated 2-liter reactor, under a nitrogen atmosphere. The mixture is heated to 250-270° C. The water of condensation is gradually removed until an acid number of between 6 and 10 mg KOH/g is obtained for a viscosity of between 6500 and 7500 mPa·s obtained by dilution with a mixture of Solvarex® 9 (TOTAL)/butyl glycol (80/20, m/m) as described in Example 14.

Example 16

468.8 g of Pripol® 1017, 754.6 g of pine oil rosin, 6.0 g of AOX-R (phenol sulfite), 80.0 g of succinic acid and 196.6 g of glycerol are placed in a stirred, temperature-regulated 2-liter reactor. The mixture is heated to 250-270° C. The water of condensation is gradually removed until an acid number of between 2 and 6 mg KOH/g is obtained for a viscosity of between 2000 and 3000 mPa·s obtained by dilution with a mixture of Solvarex® 9 (TOTAL)/butyl glycol (80/20, m/m) as described in Example 14.

Example 17

411.8 g of Pripol® 1009, 807.0 g of rosin FOR85, 4.5 g of AOX-R (phenol sulfite) and 280.4 g of polyglycerol-3 are placed in a stirred, temperature-regulated 2-liter reactor, under a nitrogen atmosphere. The mixture is heated to 250-270° C. The water of condensation is gradually removed until an acid number of between 2 and 6 mg KOH/g is obtained for a viscosity of between 2500 and 3000 mPa·s obtained by dilution with a mixture of Solvarex® 9 (TOTAL)/butyl glycol (80/20, m/m) as described in Example 14.

The four examples, 14 to 17, correspond to four polyester resins that are variants of the polyester described in Example 2 with a zero oil length or with an oil length of less than 5% as defined above according to the invention, with a rosin content that is in the region of 50% to 52%, polyesters prepared specifically for the needs of more particular applications of coil two-pack type.

The compositions of the resins of the four examples 14 to 17 are presented in Table 2a and the physicochemical characteristics in Table 3a.

TABLE 2a

Compositions of the resins of Examples 14-17

| Examples | 14 | 15 | 16 | 17 |
|---|---|---|---|---|
| Rosin | 51.7 | 50.2 | 50.3 | 51.7 |
| Polyglycerol-3 | 18.7 | | | 18.7 |
| Pentaerythritol | | 12.8 | | |
| Glycerol | | | 13.2 | |
| Residual tall oil fatty acid present in rosin** | | | | 2.1 |
| Pripol® 1009 | 29.6 | 37.0 | | 27.5 |
| Pripol® 1017 | | | 31.2 | |
| Succinic acid | | | 5.3 | |
| Oil length (weight % vs resin) | 0 | 0 | 0 | 2.4 |

*The mass content indicated in the table corresponds only to the proportion of rosin: any residual fatty acids that may be present in the initial mixture are not counted.
**This comment concerns only the examples in which tall oil rosin was used (this starting material contains about 4% tall oil fatty acid).

TABLE 3a physicochemical characteristics of the resins according to Examples 14 to 17

| Example | 14 | 15 | 16 | 17 |
|---|---|---|---|---|
| Rosin* weight % vs resin | 51.7 | 50.2 | 50.3 | 51.7 |
| Oil length (%) (oxidizable) | 0 | 0 | 0 | 0 |
| Overall fatty acid content oxidizable or non-oxidizable) | 29.6 | 37.0 | 31.2 | 29.6 |

TABLE 2

Chemical composition (weight %) of the resins of Examples 1-13

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Rosin* | 72.6 | 51.7 | 71.4 | 65.8 | 64.2 | 65.6 | 57.9 | 63.3 | 58.5 | 43.3 | 50.4 | 43.4 | 39.4 |
| Polyglycerol-3 | 18.1 | 18.7 | 22.1 | 20.8 | 21.2 | 21.7 | 22.7 | 20.9 | 20.8 | 20.9 | 21.9 | 22.9 | 22.7 |
| Soybean fatty acid (Nouracid® SZ35) | | | 6.5 | 6.7 | 9.3 | 9.5 | 9.3 | 9.2 | | | | | |
| Tall oil fatty acid (Sylfat® 2) + residual tall oil fatty acid present in rosin** | | | | | | | | | | 13.7 | 14.3 | 17.9 | 22.5 | 25.7 |
| Pripol® 1009 | 9.3 | 29.6 | | | | | | | | | | | |
| Pripol® 1017 | | | | | | | | | | 16.7 | | | |
| Succinic acid | | | | 6.6 | 5.2 | | 5.6 | 6.6 | 7.0 | 4.8 | 6.9 | 7.2 | 5.7 |
| Sebacic acid | | | | | | | | 4.5 | | | | 2.9 | 4.0 | 6.5 |
| Itaconic acid | | | | | | 3.2 | | | | | | | |
| Oil length (weight % vs resin) | 0 | 0 | 7 | 10 | 10 | 10.5 | 10 | 13 | 15 | 16 | 20 | 25 | 29 |

*The mass content indicated in the table corresponds only to the proportion of rosin: any residual fatty acids that may be present in the initial mixture are not counted.
**This comment concerns only the examples in which tall oil rosin was used (this starting material contains about 4% tall oil fatty acid).

TABLE 3

Physicochemical properties of the resins for air drying application via an aqueous formulation according to Examples 1 to 13

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Rosin* weight % vs resin | 72.7 | 51.8 | 71.4 | 65.8 | 64.2 | 65.6 | 57.9 | 63.3 | 58.5 | 43.3 | 50.4 | 43.4 | 39.4 |
| Oil length (%) (oxidizable) | 0 | 0 | 7 | 10 | 10 | 10.5 | 10 | 13 | 15 | 16 | 20 | 25 | 29 |
| Overall fatty acid content (oxidizable or non-oxidizable) | 9.3 | 29.6 | 6.5 | 9.2 | 9.3 | 9.5 | 9.3 | 11.7 | 13.7 | 31.1 | 17.9 | 22.5 | 25.7 |
| Oxidizable fatty acid content/overall fatty acid content | 0 | 0 | 1 | 1 | 1 | 1 | 1 | 1 | 1 | 0.46 | 1 | 1 | 1 |
| Ratio: rosin equivalent/fatty acid equivalent (oxidizable or non-oxidizable) | 6.4 | 1.4 | 9.1 | 8.1 | 5.7 | 5.7 | 5.1 | 5.7 | 3.5 | 1.1 | 2.3 | 1.6 | 1.3 |
| Oxidizable C=C | 0 | 0 | 0.035 | 0.058 | 0.052 | 0.051 | 0.051 | 0.058 | 0.089 | 0.106 | 0.117 | 0.147 | 0.168 |
| Measured Mn (SEC or GPC) | 1350 | 2550 | 1100 | 2000 | 1750 | 1700 | 2550 | 2000 | 2250 | 3250 | 3000 | 3250 | 3350 |
| Tg resin (° C.) | 33 | 10 | 29 | 21 | 18 | 21 | 19 | 11 | 13 | −7 | 3 | −13 | −20 |
| Gardner color | 6.5 | 5.0 | 9.0 | 6.0 | 6.6 | 8.0 | 8.2 | 5.1 | 6.0 | 8.0 | 8.5 | 7.0 | 8.0 |
| Acid number | 6.2 | 4.0 | 4.0 | 5.6 | 2.1 | 7.0 | 2.4 | 5.5 | 4.2 | 5.0 | 3.0 | 3.5 | 3.0 |

*The mass content indicated in the table corresponds only to the proportion of rosin: any residual fatty acids that may be present in the initial mixture are not counted TABLE 3a-continued physicochemical characteristics of the resins according to Examples 14 to 17

| Example | 14 | 15 | 16 | 17 |
|---|---|---|---|---|
| Oxidizable fatty acid content/overall fatty content | 0 | 0 | 0 | 0.07 |
| Ratio: rosin equivalent/fatty acid equivalent (oxidizable or non-oxidizable) | 1.4 | 1.1 | 1.3 | 1.4 |
| Oxidizable C=C (mol/kg) | 0 | 0 | 0 | 0.004 |
| Measured Mn (SEC or GPC) | 2550 | 3150 | 2400 | 2500 |
| Tg resin (° C.) | 8 | 2 | 7.5 | 9 |
| Gardner color | 6.1 | 7.5 | 7.8 | 5.2 |
| Acid number | 5.7 | 7.4 | 2.9 | 3.5 |

*The mass content indicated in the table corresponds only to the proportion of rosin: any residual fatty acids that may be present in the initial mixture are not counted.

3) Preparation of the Tested Aqueous Dispersions, Corresponding to the Resins Prepared According to Examples 1 to 13

The resins prepared according to the conditions described in Examples 1 to 13 (see point 2 above) are dispersed in water according to the same general procedure and as described below, with the sole exception of the dispersion temperature, which may vary as a function of the initial viscosity of the resin to be dispersed.

435.0 g of resin, as prepared according to Examples 1-13 described above (see point 2), melted beforehand at between 60 and 100° C., as a mixture with the following surfactants, 18.5 g of ATLAS® G5000 and 8.5 g of ZEPHRYM® 3300B (both supplied by Croda) are placed in a 1.5 liter reactor equipped with an efficient stirring system (mechanical) and are stirred for 45 minutes at a temperature of between 60° C. and 80° C. (see the values indicated in Table 4 below). If need be, the acid number of the resins is adjusted before neutralization by addition of soybean fatty acid, Nouracid® SZ35, in order to obtain a minimum acid number of 4-5 mg KOH/g. A neutralizing solution of 10% LiOH in water is then gradually added at the same temperature. It is important to note that this addition-neutralization is accompanied by a large increase in the viscosity of the medium, which is why it is essential to employ efficient mechanical stirring that is capable of operating in extremely viscous media. Finally, water is introduced at between 60-67° C. until a solids content of 40-55% is obtained. The solids content and the pH are adjusted if necessary. The final emulsion is then cooled and discharged in order subsequently to be characterized and evaluated.

The results of the characterization of the emulsions are collated in Table 4 below.

an approximately 250 ml cylindrical container. The medium is then stirred vigorously (with a Dispermat® CV machine) at room temperature (20-25° C.). In the case of the siccativated resins, the siccativating agent (Durham Co 10 WM, 0.1% cobalt metal on dry binder) is added slowly and gradually with stirring (at 700 rpm) for 5 minutes. The medium is then left to stand for 24 hours before application.

5) Characterization Methods Used 5.1) Determination of the Tg of the Resins

The glass transition temperature Tg measurement is performed using a DSCI-700 type DSC machine from Mettler with a temperature sweep at 10° C./min from −80° C. to 150° C. and after two consecutive passages (sweeps). The Tg retained is that corresponding to the second passage (sweep).

5.2) Molecular Masses of the Resins

The measurements are taken by steric exclusion chromatography (SEC), using THF as eluent, under the following conditions:

two mixed columns D+one 100 Å column, +one 50 Å column

Elution with THF as the mobile phase, at 1 ml/min and at an elution temperature of 35° C., with detection by refractive index (RI).

Calibration with 11 polystyrene standards having monodisperse molecular masses ranging from 162 to 377 400.

5.3) Evaluation of the Performance of the Novel Binders According to Examples 1 to 13 as Aqueous Dispersions The hardness evaluation is performed on films obtained by applying to a glass plate a coat of aqueous dispersion with a wet thickness of 100 µm. These are siccativated and non-siccativated gloss varnish formulations. The siccativating agent chosen is a cobalt-based monometallic system (Durham Co 10 WM, with 0.1 weight % of cobalt metal relative to the weight of dry resin). The dispersion used as comparative reference is an alkyd dispersion, which is the product Synaqua® 4804 sold by Cray Valley. The performance qualities in terms of development of hardness over time after application and of evolution of the resistance to yellowing over ageing time of the novel binders are thus compared with those of Synaqua® 4804, taken as market reference in this field.

5.3) Preparation of Gloss Varnish and Paint Formulations Based on Dispersions Prepared According to Examples 1 to 13

Preparation of Varnish Formulations

The general procedure for preparing the varnish formulations is as follows:

TABLE 4

Characteristics of the aqueous dispersions of the resins of Examples 1 to 13

| Example vs resin | 1 | 2 | 3 | 4 | 5 | 6 | 7 | 8 | 9 | 10 | 11 | 12 | 13 |
|---|---|---|---|---|---|---|---|---|---|---|---|---|---|
| Emulsification temperature | 70° C. | 80° C. | 67° C. | 70° C. | 70° C. | 70° C. | 70° C. | 70° C. | 70° C. | 70° C. | 70° C. | 80° C. | 80° C. |
| Particle size (nm) | 232 | 153 | 159 | 301 | 332 | 140 | 332 | 274 | 263 | 236 | 244 | 315 | 285 |
| Particle polydispersity | 0.06 | 0.02 | 0.07 | 0.17 | 0.10 | 0.16 | 0.18 | 0.04 | 0.00 | 0.03 | 0.05 | 0.00 | 0.00 |
| pH | 8.9 | 8.5 | 9.5 | 8.0 | 8.8 | 9.4 | 8.9 | 7.4 | 9.1 | 8.7 | 8.5 | 8.3 | 8.2 |
| % solids content | 50.0 | 46.3 | 39.0 | 50.1 | 49.9 | 41.5 | 50.2 | 50.4 | 50.3 | 50.4 | 50.7 | 48.9 | 50.8 |

4) Preparation of Varnish Formulations on the Dispersions Prepared from Resins According to Examples 1 to 13

The general procedure for preparing these varnish formulations is as follows:

150 g of aqueous binder (aqueous dispersion) as prepared according to the description in point 3) above are poured into 150 g of aqueous binder (aqueous dispersion) prepared as above are poured into an approximately 250 ml cylindrical container. The medium is then stirred vigorously (with a Dispermat® CV machine) at room temperature (20-25° C.).

FIG. 2 shows the results for the hardness evolution and Table 5 shows the results for the yellowing evolution for the non-siccativated varnishes.

For the siccativated varnishes, the siccativating agent is Durham Co 10 WM, added at 0.1% of cobalt metal relative to the dry binder (solids content of the tested dispersion) slowly and gradually while stirring at 700 rpm, over 5 minutes. The medium is then left to stand for 24 hours before application. The results in terms of the hardness evolution for these siccativated varnishes are presented in FIG. 1.

Preparation of the Gloss Paint Formulations

For the manufacture of a milling base, the water and the various constituents detailed below are placed successively in a container with stirring at high speed in a Disperlux model 2075 disperser, until a fineness<10 μm is obtained.

For the manufacture of paint, the binder (tested dispersion), the milling base prepared previously, the water and the various constituents are placed successively in a container with stirring. The siccativating agent (Botcher Oxi-Coat) is added slowly and gradually with stirring (at 700 rpm) over 5 minutes to about 1.5% for the dispersions of the invention and 0.25% for the reference Synaqua 4804® (percentage expressed relative to the dry binder) in order to obtain a series of dry paints that can be recoated 6 hours after application. The composition of the paint formulation is presented below.

Composition of the Paint Formulations of Resin Dispersions of Examples 1 to 13

| Constituent | Function | Parts by weight (%) |
| --- | --- | --- |
| Water | — | 4.50 |
| ACTICIDE MBS | Biocide | 0.20 |
| DISPERBYK 190 | Dispersant | 0.58 |
| BYK 022 | Antifoam | 0.10 |
| TIONA 595 | Pigment | 23.00 |
| Total milling base | | 28.38 |
| Tested dispersion | | 60.50 |
| BORCHI ® OXY-COAT* | Siccativating agent | 0.45* |
| Water | — | 8.81 |
| AQUAFLOW ® NMS 450 | Thickener | 0.75 |
| AQUAFLOW ® NHS 300 | Thickener | 1.15 |
| Total paint | | 100 |

*amount for reference resin Synaqua ® 4804 adjusted corresponding to 0.25% relative to the dry binder (solids content of the resin dispersion).

Characteristics of formulations (calculated by means of the formulation software "PV-FORMULA Version 2-3" from Pierre Vergne—Inter Deposti Digital Number: IDDM.FR001.280022.001.S.P.2001.0003.030265):
Volume-based pigment concentration: VPC=19%
Solids content by weight=51.1%
Solids content by volume=38.1%
Density d=1.26

Comparative tests of yellowing evolution were performed on these formulations, and the results are presented in Table 6.

5.3.2) Hardness Test: According to the Method ISO 1522

This is a Persoz hardness determined at 23° C. and at 50% relative humidity. The varnishes are applied at a wet thickness of 100 μm and are then dried on a perfectly horizontal surface at 23° C. and at a relative humidity of 50% for 24 hours before the first measurement.

5.3.3.) Measurement of the Yellowing: According to the Yellowing Index (Yi) Method ASTM E313-96

The yellowing measurements are taken on a Leneta 2A card with a wet thickness of 150 μm. The surface is then dried totally horizontally at 23° C. and at 50% relative humidity for 24 hours before the measurement using a Minolta CM2600D spectrocolorimeter (measurement on the white part of the card). The yellowing is then accelerated by placing the Leneta cards in an oven at 50° C. in the absence of light, for 15 days.

5.3.4) Blocking Resistance

The blocking resistances are determined on a Leneta 2A card with a wet thickness of 150 μm. For this test, two films of gloss paint are applied (preparation detailed in point 5.3.1) with replacement of the siccativating agent BORCHI® OXY-COAT with Durham Co 10 WM (0.1% cobalt metal on dry binder)) on separate Leneta cards, which are then positioned after 24 hours of drying at room temperature face to face so that the paints are in contact. A weight of 50 g·cm$^{-2}$ is then placed on the two cards that are face-to-face, exerting a pressure of 50 g·cm$^{-2}$. After 24 hours of contact, the two Leneta cards are separated and examined. The result obtained is expressed qualitatively as a function of the total surface area of white paint peeled off, with a note ranging from 0 (0=no point of peeling) to 8 (8 being the worst note with the plate highly degraded).

6) Results for Development of Hardness, Resistance to Yellowing and Blocking Resistance for Coatings Based on Aqueous Dispersions Obtained from the Resins According to Examples 1 to 13

The results as regards the development of hardness are presented in FIGS. 1 and 2, respectively, for siccativated and non-siccativated varnishes.

The results as regards the yellowing on varnishes whose formulation is specified in point 5.3.1) without siccativating agent are presented in Table 5 for the binders not requiring any siccativating agent in order to dry (touch-dry<24 hours) and having an oil length up to 15% (resins from Examples 1 to 9).

The yellowing results for all of the binders of the invention for a siccativated gloss paint formulation, as described in point 5.3.1), are presented in Table 6. The content of siccativating agent is adjusted and optimized to obtain a dry paint that can be recoated after 6 hours.

TABLE 5

Yellowing evolution of non-siccativated varnishes

| Resin | Ex 1 | Ex 3 | Ex 4 | Ex 5 | Ex 6 | Ex 7 | Ex 8 | Ex 9 | Synaqua ® 4804 (reference) |
| --- | --- | --- | --- | --- | --- | --- | --- | --- | --- |
| Yellowing evolution | +58% | +37% | +58% | +92% | +90% | +54% | +115% | +120% | +137% |

TABLE 6

Yellowing evolution of gloss paints

| Resin | Ex 1 | Ex 2 | Ex 3 | Ex 4-7 | Ex 8 | Ex 9 | Ex 10 | Ex 11 | Ex 12 | Synaqua® 4804 (reference) |
|---|---|---|---|---|---|---|---|---|---|---|
| Yellowing evolution (%) | +58 | +34 | +34 | +80 | +67 | +60 | +90 | +75 | +100 | +150 |

The capacity to cure faster for the novel aqueous binders of the invention is even more perceptible and notable in the absence of siccativation (see FIG. 2). FIG. 2 illustrates the development of hardness for the aqueous binders based on resins having the shortest oil length ranging from 0 to 15%, which means a zero oil length (0%) or an oil length ranging up to 15%, which is quite surprising given these very low or even zero contents. In contrast, it is noted that the resins with an oil length of about 15% to 30% require the use of siccativating agent in order to develop their high hardness potential. On the other hand, good or even excellent levels of hardness may be recorded without supplying siccativating agent, using resins with a low or even zero oil length (0-15%) (see FIG. 2).

In general, these novel resins show rapid development of hardness with hardness levels (at 15 days) largely superior to those of the reference dispersion Synaqua® 4804. For some of them (among the smallest oil lengths), the final hardnesses reached without using siccativating agent are even identical to or greater than that of the siccativated reference resin (4804®). This capacity to cure greatly, without necessary supply of siccativating agent, is a major advantage in the current environmental context.

Advantageously, faced with the toxicity problems experienced with cobalt salts, these dispersions can dry with less harmful siccativating agents (which are for the majority less active when compared with the conventional cobalt-based systems) such as iron salts (Borcher Oxy-Coat), vanadium or manganese salts. Much more advantageously, certain resins (0-15%) can dry and cure with high performance levels without the need for any siccativating agent.

Still advantageously, these resins with a greatly reduced oil length, in the absence or presence of siccativating agent, show less yellowing evolution over time (see the details in Table 5 and 6 above) when compared with the reference resin (Synaqua® 4804).

FIG. 1 shows the evolution, over time, after application, of the hardness of the coatings obtained for coating compositions (varnishes described above) in the presence of siccativating agent. The dispersions according to the invention have at least the same if not better performance in terms of rapid growth of the hardness over time (in particular for the range of dispersions based on resins with an oil length from 0 to 15%) than that of the reference dispersion (based on Synaqua® 4804 resin) despite a higher oil length for the latter.

FIG. 2 shows even better the performance of the dispersions according to the invention in the total absence of siccativating agent on varnishes. The reference dispersion is also represented in the presence of siccativating agent (0.1%) to show that the dispersions corresponding to an oil length ranging from 0 to 15%, in the absence of any siccativating agent, show better performance (on varnishes) than the reference dispersion even when comparing the latter in the presence of 0.1% siccativating agent (comparative conditions more unfavorable for the dispersions of the invention).

Advantageously, the resins with an oil length ranging from 15% to 25%, siccativated with cobalt as described above, show excellent blocking resistance in particular relative to the reference resin (Synaqua® 4804). FIG. 3 explicitly and qualitatively shows this marked difference in blocking resistance between a dispersion prepared according to Example 11 (in the left part of FIG. 3) and the reference resin (Synaqua® 4804 in the right part). Surprisingly, the resin of the invention under these conditions does not lead to any point of attachment or peeling of the coating during the blocking resistance test (note=0), in contrast with the reference resin (note=8). Since the application support for the white paint is black, this means that the black parts of the image in FIG. 3 correspond to the parts peeled off during the test (right part with note=8). In the case of the resin dispersion according to Example 11, the white image demonstrates the absence of any peeling (note=0).

7) Evaluation of the Resins of Zero Oil Length ("Oil Free") or with an Oil Length Ranging up to 5%, in a "Coil" Two-Pack System The resins concerned are described in Example 2 and in Examples 14 to 17, which are variants of the resin of Example 2 as described above.

7.1) Preparation of Non-Water-Based Formulations for "Coil" Two-Pack Coatings (Varnishes)

The solvent-based solutions (translucent) of the resins described according to Examples 14 to 17 are mixed with melamine CYMEL® 303 LF in an 85/15 weight ratio (of dry resin to melamine).

Formulation Example

| | |
|---|---|
| Resin (NVC 69.7%) | 73.7 |
| Solvarex 10 LN | 8 |
| BUTYLDIGLYCOL | 8 |
| CYMEL 303 LF | 9 |
| PTSA (12.5% butanol) | 1.3 |
| Total | 100 |

The varnishes are then applied in order to have a film thickness of 20 μm±2 μm on galvanized steel GARDOBOND Ref 1303 62 OE, 0.8 mm thick, and are then baked in an oven heated to 31.5° C. in order to reach a maximum temperature of the support metal of 232° C. before cooling.

7.2) Evaluation of the Performance of the Binders of Zero Oil Length ("Oil-Free") or with an Oil Length Ranging up to 5%, in a Coil Two-Pack System 7.2.1) Methods and Tests Used
 a) Chemical Resistance to MEK (Methyl Ethyl Ketone)
 The solvent resistance is evaluated by wearing the surface of the samples with a pad of cotton wool soaked with MEK by performing to-and-fro motions on the coatings as described in point 7.1). The test is performed at a frequency of 60 cycles/minute (1 to-and-fro motion per second) with a load of 1 kg on a linear abrasimeter. The time measured corresponds to the time for which the film of paint withstood the abrasion in the presence of the solvent.
 b) Adhesion Test
 The adhesion test and the grading are performed according to standard ISO 2409:2007 using a 3M reference 2525 adhesive tape (adhesive power: 700 cN/cm). Adhesion grading: scale from 0: good, to 5: poor. The test is repeated a second time (results presented in Table 7).
 c) Adhesion Test with Collar and Ageing at 90° C.
1) Stamping 7 mm deep at the precise place of the adhesion test is performed, using a Cupping Tester ELCOMETER 1620 type stamping machine equipped with a hemispherical-shaped punch 20 mm in diameter rising at a speed of 0.2 mm/s, on a galvanized steel plate (dimensions 100 mm×60 mm) covered with the coating as described in point 7.1).
2) The plate is then placed in an oven at 90° C. for 30 minutes. After cooling for 30 minutes in an air-conditioned room (23° C.±2° C., and 50%±5% RH), an adhesion test is performed according to standard ISO 2409.
 The whole test is repeated a second time, and the results are given in Table 7.
 d) Hardness Test (Persoz)
 Measurement of the damping of the pendulum (1 oscillation/s) according to NF EN ISO 1522 (cf. description of the test in point 5.3.2).
7.2.2) Results Obtained
 These results are presented in Table 7 below:

TABLE 7

| | Results for application on galvanized steel | | | | | |
|---|---|---|---|---|---|---|
| Example | Synolac ® 9605 S 65 | 2 | 14 | 15 | 16 | 17 |
| Chemical resistance to MEK* | 80 s | 140 s | 140 s | 100 s | 120 s | 170 s |
| Adhesion test (ISO 2409) | 0/0 | 0/0 | 0/0 | 0/0 | 0/0 | 0/0 |
| Adhesion test with collar and ageing at 90° C. | 2/2 | 0-1/0-1 | 0-1/0-1 | 0-1/0-1 | 0-1/0-1 | 0-1/0-1 |
| Persoz hardness (ISO 1522) | 296 s | 340 s | 350 s | 312 s | 320 s | 332 s |

*Methyl ethyl ketone

The resin described in Example 2 and the resins according to Examples 14 to 17 all lead, without exception, to very high performance in terms of hardness, chemical resistance and adhesion to metal (galvanized steel in the case of this application), better than those of the reference resin for coil application (Synolac® 9605 S 65). Firstly, the adhesion is found to be very greatly reinforced on metal by virtue of the incorporation of materials such as rosin and fatty acids (essentially dimers) all of natural origin. The high performance recorded regarding the hardness in a coil two-pack system confirms the substantial gain in hardness observed on the coatings (varnishes) obtained from the aqueous dispersions dried in the open air (see FIGS. 1 and 2).

The invention claimed is:

1. An aqueous resin dispersion comprising at least one polyester resin derived from:
 at least one fatty acid, and
 an acid component comprising, in addition to said fatty acid, from 45% to 75%, relative to the total weight of said resin, of rosin and/or rosin derivatives bearing at least one carboxylic acid function,
 said acid component comprising at least one acid containing at least one carboxylic acid function and having an overall functionality of 2 to 3, selected from the group consisting of saturated polyacids, ethylenically unsaturated polyacids, and hydroxy acids, wherein said polyacid comprises at least on C36 fatty acid dimer and/or C54 fatty acid trimer;
 wherein said resin has an oil length from 0% to 35%, and has a weight ratio of oxidizable fatty monoacids relative to the overall fatty acids from 0 to 1;
 wherein said resin comprises less than 5% by weight aromatic compound in addition to the rosin and/or rosin derivatives bearing at least one carboxylic acid function,
 said aqueous resin dispersion further comprising at least one surfactant selected from the group consisting of: anionic surfactant, nonionic surfactant, and at least one surfactant having both anionic and nonionic functional units, and with an overall surfactant weight ratio relative to said resin from 2% to 15%;
 whereby said resin is dispersed in water without need for organic solvent and in the absence of groups that make the resin self-dispersing.

2. The aqueous resin dispersion of claim 1, wherein said acid component comprises at least two acids, with at least one chosen from saturated polyacids and at least another chosen from unsaturated polyacids.

3. The aqueous resin dispersion of claim 1 wherein the oxidizable unsaturation content of said resin is from zero (0) to 0.25 mmol of oxidizable double bonds per g of dry resin.

4. The aqueous resin dispersion of claim 1 wherein said resin is derived from an alcohol component comprising at least one polyol having polyol functionality from 2 to 10.

5. The aqueous resin dispersion of claim 1 wherein oil length is greater than 0 and less than 35%, said acid component including at least one oxidizable fatty monoacid.

6. The aqueous resin dispersion of claim 5, wherein the oxidizable unsaturation content of said resin is greater than 0 and up to 0.25 mmol of oxidizable double bonds per g of dry resin.

7. The aqueous resin dispersion of claim 5 wherein said fatty acid is selected from the group consisting of fatty acids of soybean oil, sunflower oil, tall oil (TOFA), castor oil, dehydrated castor oil, linseed oil, and rapeseed oil, said fatty acids being in acid form or in the form of triglyceride esters of fatty acids, or of corresponding stand oils of fatty acid oils.

8. The aqueous resin dispersion of claim 5 wherein, said acid component comprises a polyacid comprising at least one C36 fatty acid dimer and/or C54 fatty acid trimer and wherein said resin is further derived from a polyol comprising at least one glycerol and/or pentaerythritol and/or dipentaerythritol oligomer.

9. The aqueous resin dispersion of claim 1 wherein said polyester is an alkyd resin with an oil content greater than 0%.

10. The aqueous resin dispersion of claim 1 wherein said resin has a zero oil content (0%) and said fatty acid is selected from non-oxidizable fatty acids with a corresponding content of oxidizable unsaturations that is 0 mmol per g of dry resin or wherein said resin has an oil content up to 5% and wherein said acid component further comprises as a minor component an oxidizable fatty acid, such that said resin has said oil content of no more than 5%.

11. The aqueous resin dispersion of claim 10, wherein said non-oxidizable fatty acid is selected from the group consisting of saturated fatty acids, fatty acids that are initially oxidizable which have been hydrogenated, and Fatty acid oligomers.

12. The aqueous resin dispersion of claim 10 wherein said resin is derived from an alcohol component comprising a glycerol oligomer, and as non-oxidizable fatty acid a C36 fatty acid dimer and/or a C54 fatty acid trimer which are hydrogenated or non-hydrogenated.

13. An aqueous resin dispersion comprising a mixture, of a first aqueous resin dispersion according to claim 1 and at least one second resin dispersion different from the first, this second resin dispersion being selected from the group consisting of alkyd dispersions, acrylic and styrene acrylic dispersions and emulsions, saturated and unsaturated polyester dispersions and polyurethane dispersions.

14. A process for preparing an aqueous resin dispersion according to claim 1 comprising a step of emulsification, at a temperature of from 30 to 90° C. of said resin by phase inversion in a reactor stirred via a dual-flow stirring system.

15. A coating composition comprising as binder at least one aqueous resin dispersion according to claim 1.

16. The coating composition as claimed in claim 15 wherein said coating is selected from the group consisting of decorative industrial coatings, and anticorrosion coatings.

17. A coating composition comprising an aqueous resin dispersion according to claim 1, and further comprising a siccativating agent and wherein said resin of said aqueous resin dispersion has an oil length (content) up to 25%.

* * * * *